H. T. SHEARER.
BELT SHIFTING MECHANISM.
APPLICATION FILED APR. 19, 1912.
1,182,807.
Patented May 9, 1916.
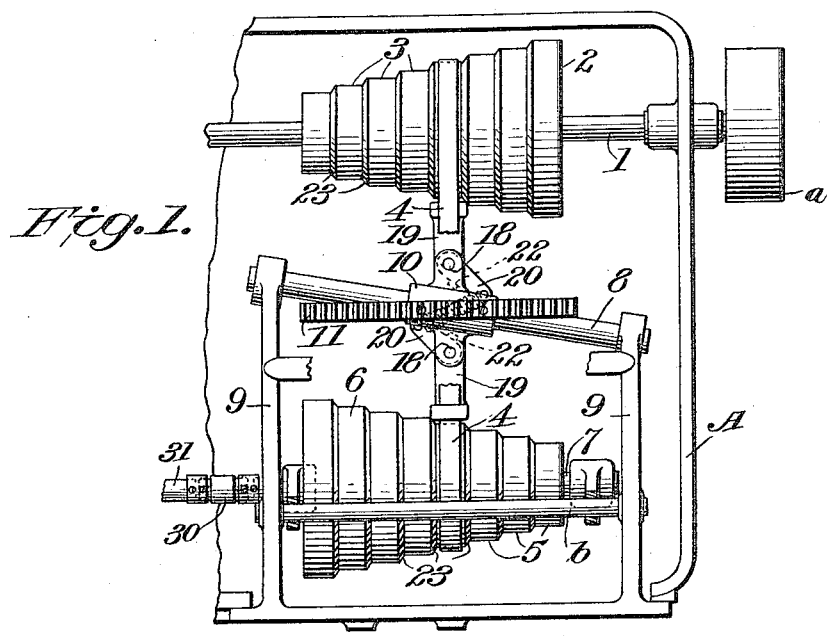
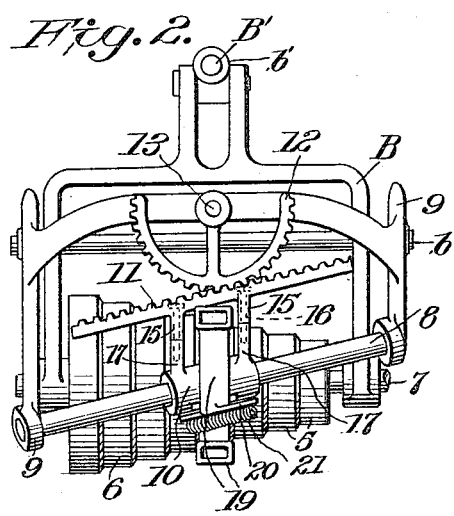
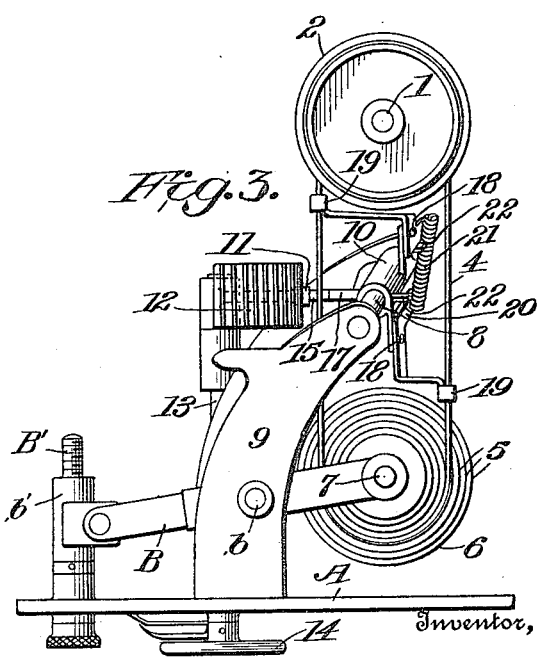
Witnesses
M. E. Jones
J. A. Braddock.
Inventor,
Harry T. Shearer,
By Bradford & Doolittle
Attorneys

UNITED STATES PATENT OFFICE.

HARRY T. SHEARER, OF WAYNESBORO, PENNSYLVANIA, ASSIGNOR TO LANDIS TOOL COMPANY, OF WAYNESBORO, PENNSYLVANIA, A CORPORATION.

BELT-SHIFTING MECHANISM.

1,182,807.   Specification of Letters Patent.   Patented May 9, 1916.

Application filed April 19, 1912. Serial No. 691,890.

*To all whom it may concern:*

Be it known that I, HARRY T. SHEARER, a citizen of the United States, residing at Waynesboro, Franklin county, and State of Pennsylvania, have invented and discovered certain new and useful Improvements in Belt-Shifting Mechanism, of which the following is a specification.

My said invention consists in certain improvements in the details of construction and arrangement of parts of belt shifting mechanism for use in a power transmission device comprising a set of cone pulleys connected by a belt, its object being to provide a means for readily shifting the belt from one set of faces on said pulleys to another, to change the speed of the driven mechanism without undue strain upon the belt or other parts, all as will be hereinafter more fully described and claimed.

Referring to the accompanying drawings, which are made a part hereof and on which similar reference characters represent similar parts, Figure 1 is a top or plan view of a power transmission of the character described, embodying my said invention, Fig. 2 a side elevation, and Fig. 3 an end elevation thereof.

In said drawings, the portions marked A represent the main frame of the power transmission mechanism and B a pivoted frame carrying the shaft of one of the cone pulleys. Said mechanism comprises a main driving shaft 1 on which is mounted a driving pulley *a* and a cone pulley 2 having a series of faces 3 of different diameters. The shoulders 23 between said several faces are preferably slightly inclined or tapered as shown.

Frame B is mounted on a pivot *b* in brackets 9 and carries a countershaft 7 on its inner end on which is mounted the other cone pulley 6 corresponding in form to the pulley 2 on shaft 1. Said pulleys are connected by belt 4 adapted to run over any two faces opposite each other on the respective pulleys. Frame B is pivotally connected at its outer end to a nut $b^1$ on an adjusting screw $B^1$ by which it may be tilted to secure any desired tension in belt 4, at will. Shaft 7 is connected by a universal coupling 30 to the shaft 31 to which the driven mechanism is geared in any appropriate manner.

A rod 8 extends on an angle parallel with the adjacent faces of pulleys 2 and 6 and midway between them, being supported by the inner ends of brackets 9. A sliding sleeve 10 is mounted upon said rod carrying a rack bar 11 supported therefrom by arms 15. A toothed segment 12 is mounted upon a shaft 13, the teeth of which are adapted to engage with the teeth of rack bar 11. Said shaft 13 is journaled in suitable bearings in the frame and provided with a hand wheel 14 on its outer end by which it may be turned. Said toothed segment 12 is formed with a face of sufficient width so that its teeth will be in mesh with the teeth of rack bar 11 throughout the movement of said rack bar longitudinally upon the angularly disposed rod 8.

Shifting forks 19 formed with appropriate arms are mounted on pivots 18 on one side of sleeve 10. Said arms are severally limited in their movement in one direction by studs 22 adjacent thereto, one arm being limited in its movement in one direction and the other arm in the other direction. The outer ends of said arms are connected by a stiff coiled spring 21 which normally tends to hold said arms in line with each other or with their inner ends against said lugs.

In operation, when it is desired to shift the belt from one set of faces to another along said cone pulleys, in order to change the speed of the driven shaft, the operator through the medium of hand wheel 14 turns the toothed segment 12 to slide sleeve 10 in the direction in which it is desired to shift said belt. The belt shifter 19 on that side of the sleeve which would carry the belt from the larger to the smaller end of the cone is held by its lug 22 in a straight position, or from turning on its pivot 18, thus forcing said belt off the larger face onto the adjoining face of less diameter. At the same time the arm of the other side of said sleeve breaks back on its pivot permitting the other end of said belt to lag behind the end which is forced forward until it has passed from the larger to the smaller face, when the slack in the belt will permit the spring 21 to contract, drawing the other end of the belt toward the larger face of the cone on the opposite side and starting said belt up over the inclined shoulder 23 between said faces. The force of the spring will be sufficient to guide said belt onto said shoulder and start the cone in rotation, whereupon said end of the belt will gradually ride up onto the face in line with the face on the other pulley to which the other end of the belt has been forcibly moved. By this means the shifting is done without any undue strain upon the belt or upon the other parts of the mechanism, the only force required being that necessary to slide sleeve 10 sufficiently to move the belt from the larger to the smaller face of the appropriate cone. The rest of the operation is accomplished automatically through the contraction of the spring 21. When the belt needs tightening, it is accomplished by the screw $B^1$ as before described. The tension of the belt may be adjusted at any time by turning screw $B^1$, which will move nut $b^1$ and tilt frame 9, as before described.

Having thus fully described my said invention what I claim as new and desire to secure by Letters Patent is:

1. A belt shifting mechanism comprising a shaft disposed between a pair of cone pulleys parallel with the taper of said pulleys, a slidable member mounted on said shaft and two independent belt shifting arms each pivoted on said member, one engaging on one side of the belt and the other on the opposite side of said belt, common means to normally maintain said arms in alinement with the plane of the travel of the belt, and means for operating said member longitudinally on said shaft, substantially as set forth.

2. A belt shifting mechanism comprising an inclined shaft, a yoke slidably mounted on said shaft, separately pivoted belt shifting arms on said yoke, a common return spring attached to each arm, and means operable to slide said yoke, substantially as described.

3. A belt shifting mechanism comprising an inclined shaft, a yoke slidably mounted on said shaft, separately pivoted belt shifting arms on said yoke, stop means to limit the movement of said arms, a common return spring attached to each arm, and means operable to slide said yoke, substantially as described.

4. A belt shifting mechanism comprising an inclined shaft, a yoke slidably mounted on said shaft, separately pivoted belt shifting angle arms on said yoke, stop means to limit the movement of said arms, a common return spring attached to each arm, a toothed rack on said yoke, a toothed segment in mesh with said rack, and an operating shaft on which said segment is secured, substantially as described.

5. A belt shifting mechanism comprising a shaft journaled in fixed bearings, a pivoted frame, a shaft journaled in said pivoted frame, a cone pulley on each of said shafts, a belt connecting thereon, an inclined shaft between said pulleys, a sliding part thereon, belt shifters separately pivoted on said sliding part, means for operating said sliding part, stops for limiting the movement of said pivoted belt shifters in one direction, and a common spring for normally holding them against said stops, substantially as set forth.

6. A belt shifting mechanism comprising a set of cone pulleys appropriately mounted, a belt connecting thereon, an inclined shaft between them, a yoke mounted to slide on said shaft, belt shifters separately pivoted on said yoke, stops for limiting the motion of said belt shifters in one direction, a common spring for normally holding them against said stops, a rack-bar carried by said sliding yoke, and a pinion mounted in engagement with said rack-bar for operating the same, substantially as described.

In witness whereof, I have hereunto set my hand and seal at Waynesboro this 16th day of April, A. D. nineteen hundred and twelve.

HARRY T. SHEARER. [L. S.]

Witnesses:
CHAS. B. CLAYTON,
K. HARPER WASHABAUGH.

Copies of this patent may be obtained for five cents each, by addressing the "Commissioner of Patents. Washington, D. C."